United States Patent [19]

Itoh et al.

[11] 3,846,584

[45] Nov. 5, 1974

[54] HORIZONTAL AUTOMATIC FREQUENCY CONTROL CIRCUIT

[75] Inventors: Takashi Itoh; Akio Nakashima; Yoshihiro Arakawa, all of Yokohama, Japan

[73] Assignee: Hitachi, Ltd., Tokyo, Japan

[22] Filed: Oct. 5, 1973

[21] Appl. No.: 403,834

[30] Foreign Application Priority Data

Oct. 9, 1972 Japan ............................ 47-100692

[52] U.S. Cl. .......... 178/69.5 TV, 178/7.5 S, 331/20

[51] Int. Cl. ............................................ H04n 5/04

[58] Field of Search .. 178/69.5 TV, 7.5 S, 69.5 DC; 328/139; 331/182, 183, 32, 20

[56] References Cited

UNITED STATES PATENTS

| | | | |
|---|---|---|---|
| 2,697,131 | 12/1954 | Baroch | 331/20 |
| 3,070,657 | 12/1962 | Shimada | 178/69.5 |
| 3,641,265 | 2/1972 | Ganske | 178/69.5 |

*Primary Examiner*—Richard Murray
*Assistant Examiner*—R. John Godfrey
*Attorney, Agent, or Firm*—Craig & Antonelli

[57] ABSTRACT

A horizontal automatic frequency control circuit comprising a synchronizing signal separating circuit, a horizontal oscillation circuit, a horizontal deflection circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, a low-pass filter connected between said phase sensitive detector and said horizontal oscillation circuit, switching means connected to said low-pass filter for disconnectably connecting said low-pass filter to the transmission path between said phase sensitive detector and said horizontal oscillation circuit, and means for controlling said switching means by vertical synchronizing pulses so as to disconnect said low-pass filter from said transmission path for a predetermined limited period of time following the appearance of the vertical synchronizing signal. According to the present invention, the phase of the horizontal oscillation circuit can quickly respond to phase shift of the horizontal synchronizing signal by the disconnection of the low-pass filter from the transmission path.

4 Claims, 7 Drawing Figures

FREQUENCY LOW

FREQUENCY HIGH

HORIZONTAL AUTOMATIC FREQUENCY CONTROL CIRCUIT

This invention relates to automatic frequency control circuits, and more particularly to a horizontal automatic frequency control circuit for use in a reproducing apparatus which is adapted for obtaining a still picture by deriving a one-field picture signal from a television signal obtained by interlaced scanning of a picture, recording the one-field picture signal and repeatedly reproducing this recorded signal.

Figure 1:
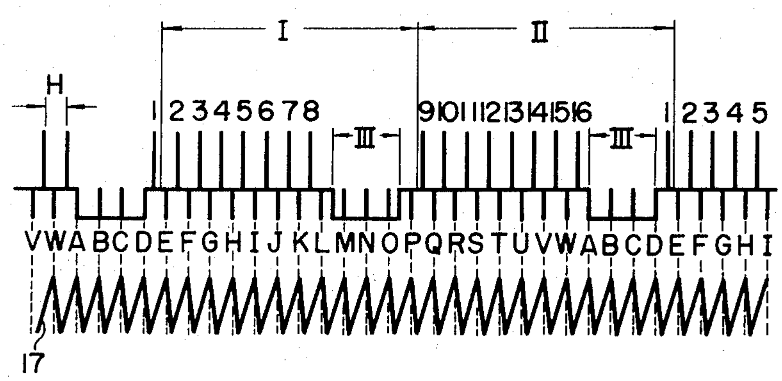
FIG. 1 PRIOR ART
Figure 2A:
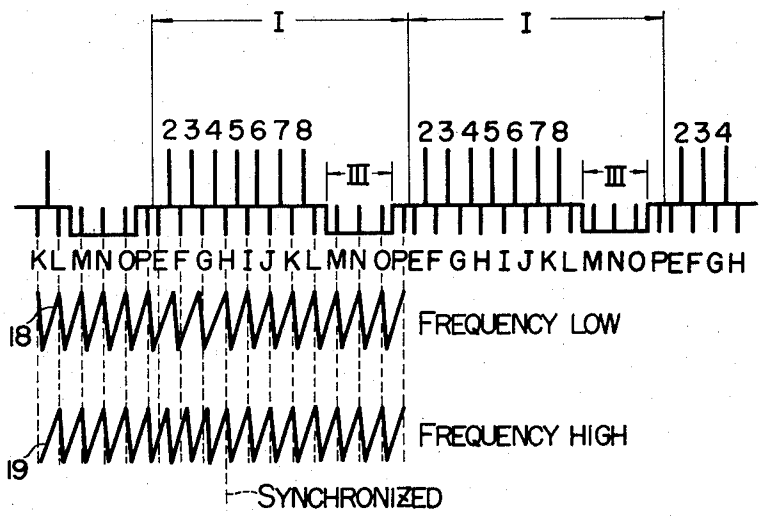
FIG. 2a PRIOR ART
Figure 2B:
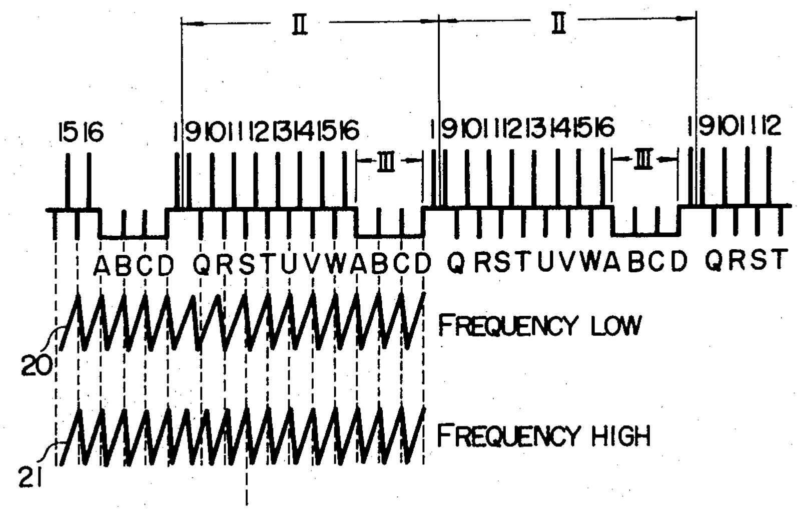
FIG. 2b PRIOR ART

FIGS. 1, 2*a* and 2*b* show waveforms of a simplified television signal which comprises odd field television signal portions I, even field television signal portions II and vertical synchronizing signal portions III. In FIGS. 1, 2*a* and 2*b*, one to 16 designate picture signal portions, A to W horizontal synchronizing pulses, and 17 to 21 horizontal deflection current waveforms.

It will be apparent from FIG. 1 that, according to the television broadcasting system presently employed, the length of one frame is selected to have a value which is odd times the horizontal period H of a television signal obtained by interlaced scanning of a picture so that horizontal synchronizing pulses appear at intervals of the horizontal period H. Therefore, in a television receiver which receives a television signal consisting of orderly transmitted odd fields I and even fields II, a horizontal automatic frequency control circuit (hereinafter abbreviated as a horizontal AFC circuit) comprising a phase sensitive detector for comparing the phase of horizontal synchronizing pulses with the phase of flyback pulses and a horizontal oscillator controlled by the output of the phase sensitive detector is provided for producing a horizontal deflection current waveform 17 which is in synchronism with the television signal arriving at the television receiver. Further, due to the fact that variations in the horizontal repetition frequency of the television signal of the kind above described are very small, the AC loop gain of the horizontal AFC circuit in the television receiver can be selected to be fairly small. Therefore, the noise band width can be sufficiently reduced and the noise suppression characteristic can be improved in the horizontal AFC circuit in the television receiver.

However, a horizontal AFC circuit customarily used in television receivers is not suitable for use in a field memory type reproducing apparatus which is adapted for obtaining a still picture by extracting a one-field picture signal from a television signal, recording the one-field picture signal and repeatedly reproducing this recorded signal. The reasons therefor will be described with reference to FIGS. 2*a* and 2*b*.

As described hereinbefore, one frame of a television signal is selected to have a value which is odd times the horizontal repetition period for the purpose of interlaced scanning. Thus, in any case in which the odd field I or even field II is extracted from the television signal, the length of one field is equal to $m$H + 1/2H where $m$ is an integer. Therefore, when the odd field I is solely extracted, recorded and repeatedly reproduced, the interval between the horizontal synchronizing pulses P and E in the adjoining range of the repeated picture signals is equal to 1/2H as seen in FIG. 2*a*. On the other hand, when the even field II is solely extracted, recorded and repeatedly reproduced, the interval between the horizontal synchronizing pulses D and Q in the adjoining range of the repeated picture signals is equal to 3/2H as seen in FIG. 2*b*. Therefore, when the horizontal synchronizing pulses E to P in FIG. 2*a* or the horizontal synchronizing pulses A to D and Q to W in FIG. 2*b* are used to obtain horizontal deflection current under control of the prior art horizontal AFC circuit customarily employed in the television receiver, the horizontal deflection current thus obtained will have waveforms as shown by 18, 19, 20 or 21 in FIGS. 2*a* and 2*b*. It will be seen that this current waveform cannot quickly respond to the phase shift of 1/2H or 3/2H and its frequency is gradually increased or decreased until the current waveform becomes synchronous with the horizontal synchronizing signal in the composite television signal after a period of time corresponding to several horizontal periods.

Figure 3A:
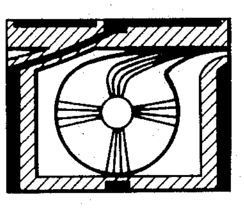
Figure 3B:
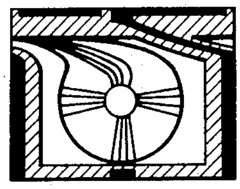

Such a state is pictorially illustrated in FIGS. 3*a* and 3*b*. The upper portion of the reproduced picture is bent rightward as shown in FIG. 3*a* when the frequency of the horizontal deflection current is low, while the upper portion of the reproduced picture is bent leftward as shown in FIG. 3*b* when the frequency of the horizontal deflection current is high.

This defect may be overcome by increasing the AC loop gain of the horizontal AFC circuit in the filed memory type reproducing apparatus to a very large value thereby increasing the follow-up speed of the AFC so that the AFC circuit can quickly respond to the phase shift of 1/2H or 3/2H.

However, in commonly frequently employed horizontal AFC circuits including therein a low-pass filter having one pass band (a single pole-single zero low pass filter), there is the following relation between the AC loop gain $m{\cdot}f_o$ and the noise band width fNN:

$$fNN = \pi/2\ (m{\cdot}f_o + b/2\pi) \quad (1)$$

where $m = a/b$, a is the angular frequency at the cut-off point of the low-pass filter, $b$ is the angular frequency at the zero point of the low-pass filter, and $f_o$ is the DC loop gain of the horizontal AFC circuit.

Therefore, as will be apparent from the equation (1), an increase in the AC loop gain $m{\cdot}f_o$ results in an increase in the noise band width fNN, and the desired noise suppression characteristic cannot be obtained. such a horizontal AFC circuit is defective in that serrations appear in reproduced pictures or unstable pictures unsuitable for practical reproduction are reproduced due to noise.

It is therefore an object of the present invention to provide a novel and effective horizontal automatic frequency control circuit.

Another object of the present invention is to provide a horizontal automatic frequency control circuit in which means are provided so that the phase of the horizontal oscillation circuit can quickly respond to phase shift of the horizontal synchronizing signal appearing after the vertical synchronizing signal.

A further object of the present invention is to provide, in a reproducing apparatus for obtaining a still picture by extracting a one-field picture signal from a television signal, recording the one-field picture signal and repeatedly reproducing this recorded signal, a horizontal automatic frequency control circuit in which means are provided so that the horizontal oscillation circuit can quickly respond to variations in the phase of the horizontal synchronizing signal appearing after the vertical synchronizing signal and the noise band width can be reduced during the vertical scanning period for improving the noise suppression characteristic.

In accordance with the present invention, there is provided a horizontal automatic frequency control circuit comprising a synchronizing signal separating circuit for separating a synchronizing signal from a reproduced composite picture signal, a horizontal oscillation circuit, a horizontal deflection circuit for supplying deflection current to a horizontal deflection coil unit utilizing the signal applied from said horizontal oscillation circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, means for applying said control signal to said horizontal oscillation circuit for controlling the phase of said horizontal oscillation circuit, a low-pass filter connected between said phase sensitive detector and said horizontal oscillation circuit, switching means connected to said low-pass filter for disconnectably connecting said low-pass filter to the transmission path between said phase sensitive detector and said horizontal oscillation circuit, and means for controlling said switching means by vertical synchronizing pulses so as to disconnect said low-pass filter from said transmission path for a predetermined limited period of time following the appearance of the vertical synchronizing signal, so that the AC loop gain of said horizontal automatic frequency control circuit can be increased by the disconnection of said low-pass filter from said transmission path and the phase of said horizontal oscillation circuit can quickly respond to phase shift of the horizontal synchronizing signal.

Figure 4:
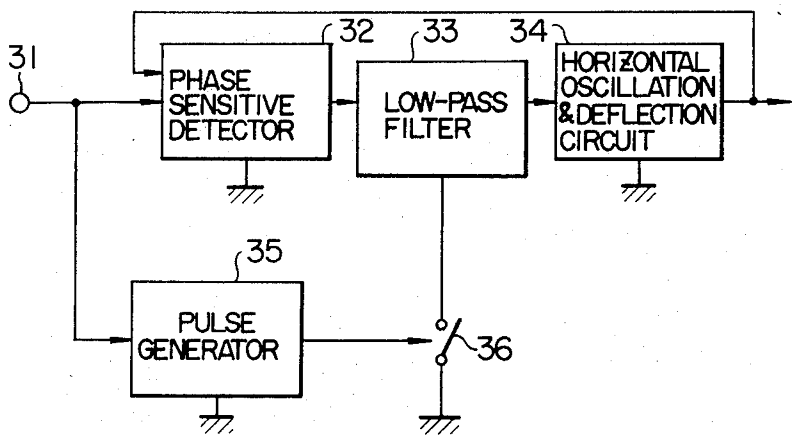
Figure 5:
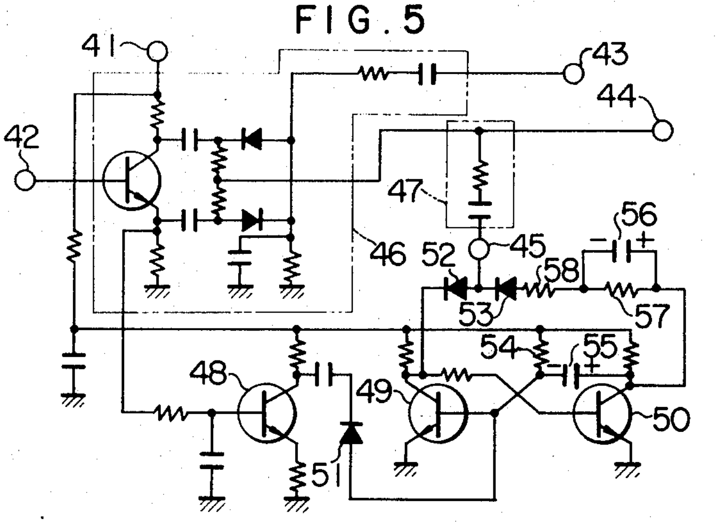

The above and other objects, features and advantages of the present invention will be apparent from the following description taken in conjunction with the accompanying drawing, in which:

FIGS. 1, 2*a* and 2*b* show waveforms of a simplified television signal and horizontal deflection current;

FIGS. 3*a* and 3*b* show still pictures obtained be recording one field portion of the television signal and repeatedly reproducing such signal portion while carrying out horizontal synchronization by a prior art horizontal AFC circuit;

FIG. 4 is a block diagram of a horizontal AFC circuit embodying one form of the present invention; and FIG. 5 is a circuit diagram showing a practical structure of the horizontal AFC circuit of the present invention shown in FIG. 4.

Referring to FIG. 4, a horizontal AFC circuit embodying one form of the present invention comprises a synchronizing signal input terminal 31, a phase sensitive detector 32, a low-pass filter 33, a horizontal oscillation and deflection circuit 34, a pulse generator 35 which generates switching pulses which have a specific duration and are synchronous with vertical synchronizing pulses, and a switch 36 which is urged to the open position in response to the application of the switching pulse from the pulse generator 35 and which is maintained short-circuited during the remaining period of time.

In the circuit shown in FIG. 4, the pulse generator 35 applies the switching pulse to the switch 36 to urge the switch 36 to the open position and maintain the switch 36 in such position for a specific period of time following the vertical synchronizing signal interval, thereby disconnecting the low-pass filter 33 from the AFC circuit for increasing the AC loop gain during this period of time. Preferably, this period of time is selected to be the vertical blanking period before the arrival of the picture signal corresponding to the next field. After this period of time, the switch 36 is closed to connect the low-pass filter 33 to the AFC circuit again thereby reducing the AC loop gain and improving the noise suppression characteristic.

Referring to FIG. 5 showing a practical structure of the embodiment shown in FIG. 4, the horizontal AFC circuit comprises a power supply terminal 41, a synchronizing signal input terminal 42 for receiving both the horizontal synchronizing signal and the vertical synchronizing signal, a phase comparing pulse input terminal, for example, a flyback pulse input terminal 43, an AFC voltage output terminal 44, a phase sensitive detector 46, a low-pass filter 47 having a normally grounded terminal 45, a transistor 48 for amplifying synchronizing pulses obtained by integrating the vertical synchronizing signal, a pair of transistors 49 and 50 constituting a monostable multivibrator, a trigger pulse passing diode 51, a pair of diodes 52 and 53 constituting a switching means together with the transistors 49 and 50, a resistor 54 and a capacitor 55 for determining the switching duration of the switching means, a capacitor 56 for cutting off the diodes 52 and 53 during the switching period, a discharge resistor 57 for the capacitor 56, and a resistor 58.

In the circuit shown in FIG. 5, the transistors 49 and 50 constituting the monostable multivibrator are normally conducting and non-conducting respectively. Therefore, the diodes 52 and 53 are forward biased through the resistors 57 and 58 and the terminal 45 of the low-pass filter 47 is grounded through the diode 52 and transistor 49. In response to the application of a vertical synchronizing pulse of positive polarity to the base of the transistor 48, a pulse of negative polarity appears at the collector of the transistor 48 to be applied to the base of the transistor 49 through the diode 51. At this moment, the transistor 49 is cut off and the transistor 50 conducts so that the diodes 52 and 53 are reverse biased by the collector voltage of the transistor 49 and by the voltage charged in the capacitor 56. Therefore, the terminal 45 of the low-pass filter 47 is completely electrically isolated from the ground potential.

It will thus be seen that, according to the present invention, the low-pass filter 47 is disconnected from the horizontal AFC circuit during the vertical blanking period. Therefore, the AC loop gain of the horizontal AFC circuit is increased to a level substantially equal to that of the DC loop gain so that the horizontal AFC circuit can follow variations in the phase of the horizontal synchronizing signal in the range between the adjoining picture signals.

The period of time during which the AC loop gain increases is determined by the resistance of the resistor 54 and the capacitance of the capacitor 55 associated with the monostable multivibrator. More precisely, in response to the conduction of the transistor 50, the positive electrode side of the capacitor 55 is grounded and a negative voltage is applied to the base of the transistor 49 to cut off the transistor 49. The transistor 49 conducts again when the charge stored in the capacitor 55 is discharged through the resistor 54 until the base voltage of the transistor 49 is approximately equal to zero. Therefore, the increasing period of time of the AC loop gain is determined by the resistance of the resistor 54 and the capacitance of the capacitor 55. When the charge stored in the capacitor 55 is discharged until the base voltage of the transistor 49 is approximately equal to zero, the transistor 49 conducts and the transistor 50 is cut off again to connect the low-pass filter 47 to the AFC circuit so that the AC loop gain of the horizontal AFC circuit is reduced and the noise band width is also reduced. Similar operation is repeated each time a vertical synchronizing pulse is applied to the base of the transistor 48, and thus, the response of the horizontal AFC circuit can be improved without sacrificing the noise suppression characteristic of the AFC circuit during the vertical scanning period.

The present invention having the features above described provides the following advantages:

1. The horizontal AFC circuit can quickly respond to phase shift occurring following the appearance of the vertical synchronizing signal without sacrificing the noise suppression characteristic of the horizontal AFC circuit during the vertical scanning period by virtue of the fact that the AC loop gain of the horizontal AFC circuit during the picture signal appearing period of time (vertical scanning period) is varied from that during the picture signal disappearing period of time (vertical blanking period) by the provision of switching means.

2. The responsive time of the horizontal AFC circuit can be suitably adjusted because the switching period can be freely selected.

What is claimed is:

1. A horizontal automatic frequency control circuit comprising a synchronizing signal separating circuit for separating a synchronizing signal from a reproduced composite picture signal, a horizontal oscillation circuit, a horizontal deflection circuit for supplying deflection current to a horizontal deflection coil unit utilizing the signal applied from said horizontal oscillation circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, means for applying said control signal to said horizontal oscillation circuit for controlling the phase of said horizontal oscillation circuit, a low-pass filter connected between said phase sensitive detector and said horizontal oscillation circuit, switching means connected to said low-pass filter for disconnectably connecting said low-pass filter to the transmission path between said phase sensitive detector and said horizontal oscillation circuit, and means for controlling said switching means by vertical synchronizing pulses so as to disconnect said low-pass filter from said transmission path for a predetermined limited period of time following the appearance of the vertical synchronizing signal, so that the AC loop gain of said horizontal automatic frequency control circuit can be increased by the disconnection of said low-pass filter from said transmission path and the phase of said horizontal oscillation circuit can quickly respond to phase shift of the horizontal synchronizing signal.

2. In a still picture reproducing apparatus for obtaining a still picture by extracting a one-field picture signal from a television signal, recording the one-field picture signal and repeatedly reproducing this recorded signal, a horizontal automatic frequency control circuit comprising a synchronizing signal separating circuit for separating a synchronizing signal from a reproduced composite picture signal, a horizontal oscillation circuit, a horizontal deflection circuit for supplying deflection current to a horizontal deflection coil unit utilizing the signal applied from said horizontal oscillation circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, means for applying said control signal to said horizontal oscillation circuit for controlling the phase of said horizontal oscillation circuit, a low-pass filter consisting of a resistor and a capacitor connected in series, a switch for disconnecting said low-pass filter from the transmission path between said phase sensitive detector and said horizontal oscillation circuit, and means for controlling said switch by vertical synchronizing pulses so as to disconnect said low-pass filter from said transmission path for a predetermined limited period of time following the appearance of the vertical synchronizing signal, so that the AC loop gain of said horizontal automatic frequency control circuit can be increased by the disconnection of said low-pass filter from said transmission path and the phase of said horizontal oscillation circuit can quickly respond to phase shift of the horizontal synchronizing signal occurring every field.

3. In a still picture reproducing apparatus for obtaining a still picture by extracting a one-field picture signal from a television signal, recording the one-field picture signal and repeatedly reproducing this recorded signal, a horizontal automatic frequency control circuit comprising a synchronizing signal separating circuit for separating a synchronizing signal from a reproduced composite picture signal, a horizontal oscillation circuit, a horizontal deflection circuit for supplying deflection current to a horizontal deflection coil unit utilizing the signal applied from said horizontal oscillation circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, means for applying said control signal to said horizontal oscillation circuit for controlling the phase of said horizontal oscillation circuit, a low-pass filter connected between said phase sensitive detector and said horizontal oscillation circuit, a pulse generating circuit for generating pulses synchronous with vertical synchronizing pulses, a switch consisting of a monostable multivibrator arranged to be inverted in response to the application of said pulse and maintained in such a state for a predetermined limited period of time and at least two diodes connected in series across the output terminals of said monostable multivibrator, said low-pass filter being connected to the connection point between said two diodes in said switch, and means for connecting said low-pass filter to the transmission path between said phase sensitive detector and said horizontal oscillation circuit when said pulse is not applied to said monostable multivibrator and disconnecting said low-pass filter from said transmission path by said switch for a predetermined limited period of time when said pulse is applied to said monostable multivibrator, so that the AC loop gain of said horizontal automatic frequency control circuit can be increased during this period of time and the phase of said horizontal oscillation circuit can quickly respond to phase shift of the horizontal synchronizing signal occurring every field.

4. In a still picture reproducing apparatus for obtaining a still picture by extracting a one-field picture signal from a television signal, recording the one-field picture signal and repeatedly reproducing this recorded signal, a horizontal automatic frequency control circuit comprising a synchronizing signal separating circuit for separating a synchronizing signal from a reproduced composite picture signal, a horizontal oscillation circuit, a horizontal deflection circuit for supplying deflection current to a horizontal deflection coil unit utilizing the signal applied from said horizontal oscillation circuit, a phase sensitive detector for comparing horizontal synchronizing pulses applied from said synchronizing signal separating circuit with phase comparing pulses derived from said horizontal deflection circuit thereby generating at the output thereof a control signal representative of the difference between the phase of the horizontal synchronizing pulses and the phase of the phase comparing pulses, means for applying said control signal to said horizontal oscillation circuit for controlling the phase of said horizontal oscillation circuit, a low-pass filter consisting of a resistor and a capacitor connected in series, means for connecting one of the terminals of said low-pass filter to the transmission path between said phase sensitive detector and said horizontal oscillation circuit, means for obtaining pulses synchronous with vertical synchronizing pulses separated by said synchronizing signal separating circuit, a switch consisting of a monostable multivibrator arranged to be inverted in response to the application of said pulse and maintained in such a state for a predetermined limited period of time and at least two diodes connected across the output terminals of said monostable multivibrator, and means for connecting the other terminal of said low-pass filter to the connection point between said two diodes in said switch, whereby said monostable multivibrator can be inverted in response to the application of said pulse and said low-pass filter can be disconnected from said transmission path so that the AC loop gain of said horizontal automatic frequency control circuit can be increased during this period of time and the phase of said horizontal oscillation circuit can quickly respond to phase shift occurring every field.

* * * * *